Gernes & Gruenhagen,
Stump Extractor.
No. 103,171.                    Patented May 17, 1870.

Witnesses:
E. J. Somme
Phil. T. Dodge

Inventors:
J. H. Gruenhagen
Ch. Gernes
by Dodge & Munn
their attys.

United States Patent Office.

CHARLES GERNES AND JOHN H. GRUENHAGEN, OF WINONA, MINNESOTA.

Letters Patent No. 103,171, dated May 17, 1870.

IMPROVED STUMP-EXTRACTOR.

The Schedule referred to in these Letters Patent and making part of the same.

*To all whom it may concern:*

Be it known that we, CHARLES GERNES and JOHN H. GRUENHAGEN, of Winona, in the county of Winona and State of Minnesota, have invented certain Improvements in Stump-Pulling Machines, of which the following is a specification, reference being had to the accompanying drawings.

Our invention consists in a novel manner of constructing and arranging the various parts of the machine, so as to adapt it for being operated by animal power, and in mounting it upon wheels, so as to be readily transported from place to place, the machine being also provided with certain anchoring devices for holding it stationary while in operation.

Figure 1:
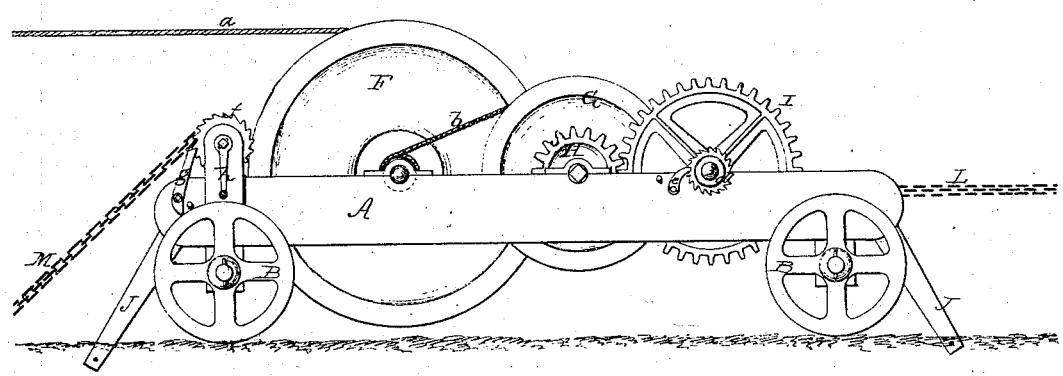
Figure 2:
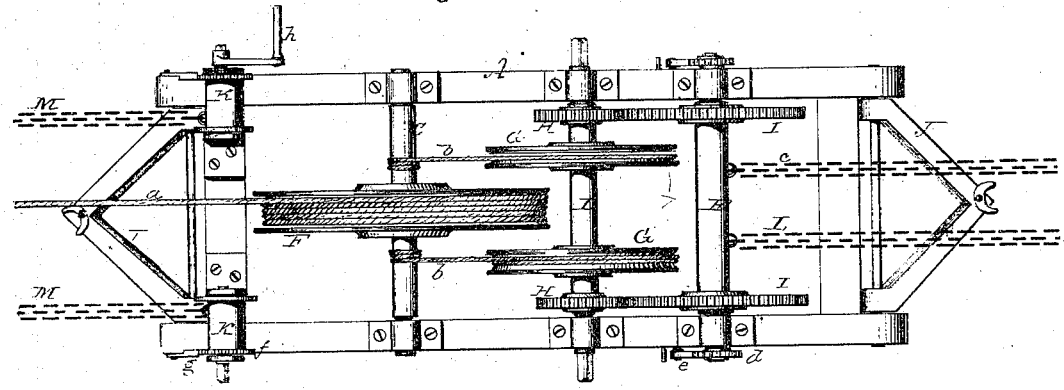

Figure 1 is a side elevation of our machine;

Figure 2, a top plan view of the same; and

Figure 3:
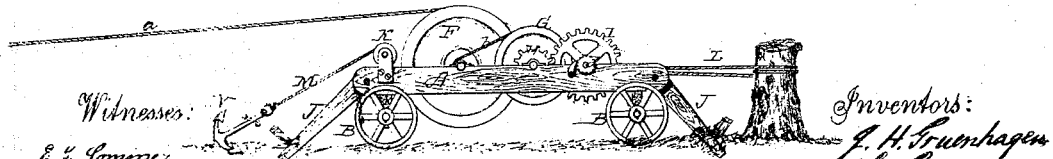

Figure 3, a side elevation of the machine in operation.

In constructing our machine, we make a strong rectangular frame, A, and mount it on four truck-wheels, B, and upon and crosswise of this frame mount three parallel shafts, C, D, and E.

Upon the middle of the shaft C we secure a large drum or pulley, F, having a rope, *a*, secured to and wound around it, with the end passing from the machine, as shown in figs. 1, 2, and 3, and to the end of which rope the horse or other animal is secured, when operating the machine.

On the shaft D we secure two like drums or pulleys, G, of somewhat less diameter than the drum F, and each having a rope or chain, *b*, secured to and wound upon it, and both of these chains having their ends secured to shaft C, one on each side of pulley or drum F, as shown in fig. 2.

On each end of the shaft D, outside of the pulleys G, we secure a pinion, H, and on the ends of shaft E secure cog-wheels I, into which the pinions mesh, as shown in figs. 1, 2, and 3, and on the ends of this shaft E, outside of the frame, we also secure ratchet-wheels *d*, into which pawls *e*, secured to the frame, engage, so as to prevent the shaft from turning backward.

To the shaft E we attach the ends of two chains, or the two ends of one chain, L, as desired, this chain being wound around or otherwise secured to the stump to be extracted.

When the parts are thus connected and arranged, it will be seen that, if the rope *a* be pulled so as to unwind and turn the drum F and its shaft C, the cords *b* will be wound upon shaft C and the pulleys G and their shaft D, and its pinions H be set in motion, and that these pinions will, in turn, operate the wheels I and wind the chain L upon their shaft E with a very slow but powerful motion, and thus that, if the chain L be attached to a stump, and the machine fastened in place, the stump will be pulled up.

To provide for securing the machine in position, we hinge to each end of the frame A a triangular frame or brace, J, which may be turned down upon the ground, and fastened by stakes or otherwise, and upon each of the rear corners of the frame mount a windlass, K, provided with a crank and ratchet-wheel, and having connected to it a rope or chain, M, having an anchor, N, or a grapple secured to its end, as shown in figs. 1, 2, and 3.

When the machine is to be fastened in place, the frames or braces J are turned down and fastened, and then the anchors made fast in the ground or to stumps, or to any other stationary object, and the windlasses turned until the chains are taut.

By planting the anchors ahead some distance, and then turning the windlasses K, the machine may be moved forward by hand, as desired.

By the double arrangement of drums, ropes, pinions, &c., we distribute the strain generally over the whole frame, and prevent any side-strain which would tend to twist and weaken the frame.

In this manner we produce a cheap and powerful portable machine, of great service in extracting stumps, stones, &c.

After the cords or chains have been unwound from the drums, as described, they are rewound, and thus the machine again prepared for operation, by applying a crank to the end of shaft D, and, after lifting the pawls *e*, turning the shaft backward.

Having thus described our invention,

What we claim is—

1. A machine for pulling stumps, consisting of the frame A, mounted on wheels, and having the shafts C, D, and E mounted thereon, said shafts being provided with the drums, cords, gearing, and chains, arranged substantially as described.

2. The windlass K, chain M, and grapple N, in combination with a stump-pulling machine, constructed and arranged to operate substantially as described.

CHAS. GERNES.
JOHN H. GRUENHAGEN.

Witnesses:
WILLIAM MITCHELL,
W. C. HUEY.